Feb. 13, 1951          A. H. TITUS          2,541,445
FRICTION BRAKE
Filed April 3, 1947          2 Sheets-Sheet 1

INVENTOR
Armour H. Titus

Feb. 13, 1951     A. H. TITUS     2,541,445
FRICTION BRAKE
Filed April 3, 1947     2 Sheets-Sheet 2
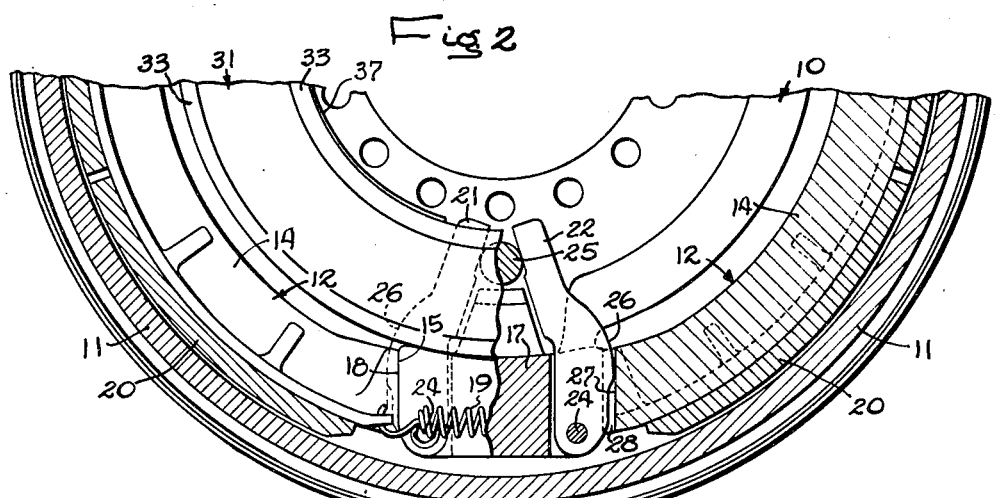
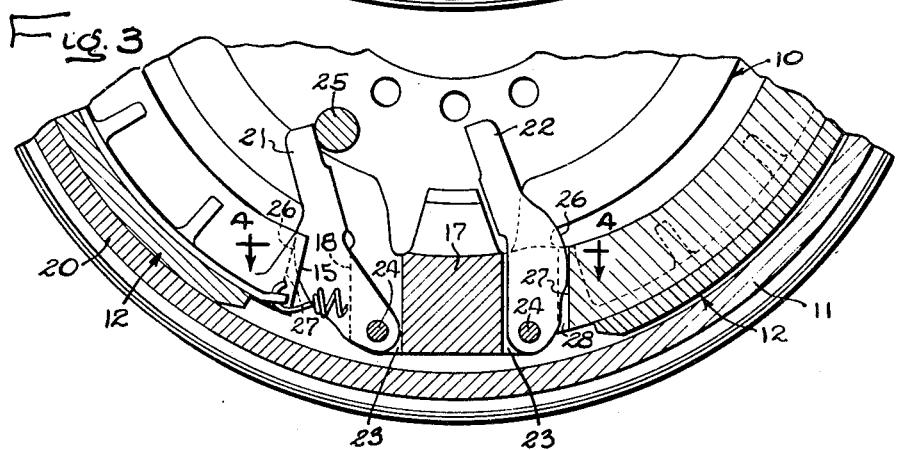
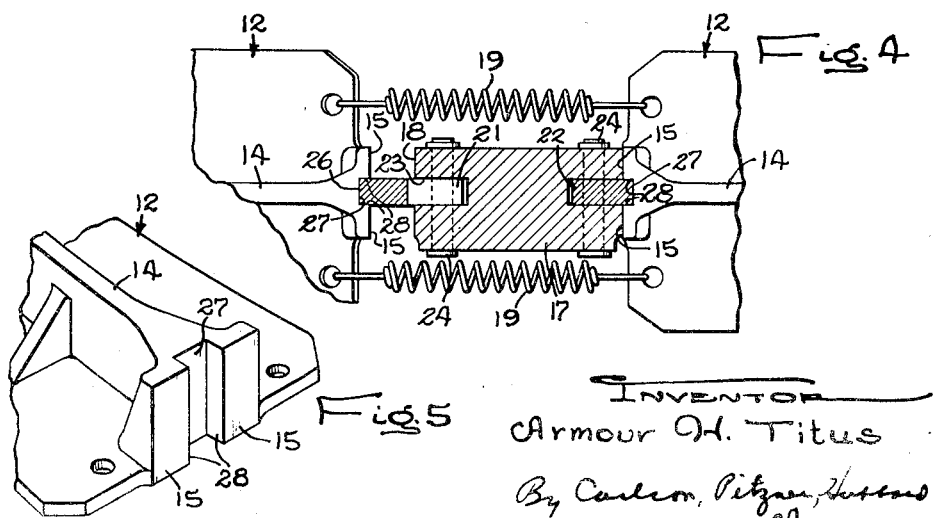
INVENTOR
Armour H. Titus
By Carlson, Pitzner, Hubbard & Wolfe
ATTORNEYS Patented Feb. 13, 1951

2,541,445

UNITED STATES PATENT OFFICE 2,541,445

FRICTION BRAKE

Armour H. Titus, Beloit, Wis., assignor to Warner Electric Brake & Clutch Company, a corporation of Illinois Application April 3, 1947, Serial No. 739,157

1 Claim. (Cl. 188—78)

This invention relates to friction brakes and clutches, particularly those of the internal expanding type in which an annular friction element is expanded into gripping engagement with a rotating drum surface by actuating either one of a pair of expanding devices.

The primary object is to interconnect the two expanding devices and the ends of the friction element in a novel manner such that these devices perform the function of holding the element ends centered laterally at all times.

A more detailed object is to provide a novelly arranged tongue and groove connection between each expanding device and its associated element end.

Other objects and advantages of the invention will become apparent from the following detailed description taken in connection with the accompanying drawings, in which Figure 1 is a diametrical sectional view of a friction brake embodying the novel features of the present invention.

Fig. 2 is a fragmentary sectional view taken along the line 2—2 of Fig. 1 and partially broken away along the line 2ª—2ª of Fig. 1.

Fig. 3 is a similar view with the parts in actuated position.

Fig. 4 is a fragmentary sectional view taken along the line 4—4 of Fig. 3.

Fig. 5 is a fragmentary perspective view of one of the ends of the friction element.

Figure 1:
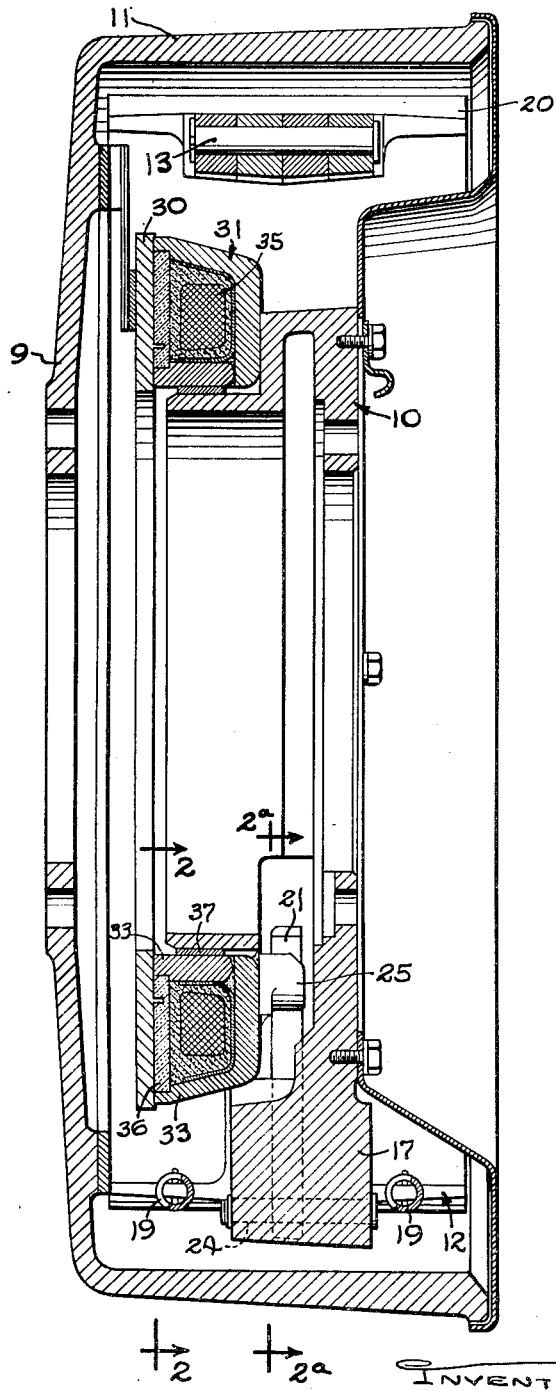

In the drawings, the invention is incorporated for purposes of illustration in a brake mechanism mounted on a nonrotatable anchor structure 10 for radial expansion of its annular friction element into gripping engagement with the internal surface of a rotatable drum 11. An inturned flange 9 at one end of the drum is bolted to the part whose rotary motion is to be controlled. Herein, the friction element of the brake comprises two semicircular shoes 12 connected together at one end by a circumferentially floating pivot 13 and radially expansible by separation of their other ends which are reinforced by ribs 14 and terminate in flat end surfaces 15. The shoe ends anchor against the oppositely facing side surfaces 18 of an outwardly projecting arm 17 on the anchor structure 10 and are normally drawn against these surfaces by contractile springs 19. Each shoe is covered with a layer 20 of friction material.

Expansion of the shoes against the drum is effected by actuation of one or the other of two expanding devices herein shown as comprising cranks 21 and 22 which are disposed in and are guided by side slots 23 formed in the anchor lug 17 in the center plane of the friction element. Each crank is pivoted adjacent the drum on a cross pin 24 extending through the anchor lug parallel to the drum axis. The free ends of the crank arms project inwardly and are disposed on opposite sides of an actuating pin 25 which is movable circumferentially in a manner to be described later. The outer edge of each crank bulges outwardly beyond the abutments 18 and terminates in a cam surface 26 which bears against a surface 27 lying along the center plane of the shoe and separating the end surface 15 thereof into two parts.

To form the tongue and groove connection by which the cranks are utilized to maintain the shoes centered relative to the drum surface at all times, each surface 27 engaged by the cam surface 26 is set in from the end 15 of the shoe so as to form a groove lying in the plane of the shoe center lines and having opposed parallel side walls 28 which are spaced apart to correspond to the thickness of the edge of the associated cam 26. This edge is thus straddled by the walls 28 and, since the crank is guided in the slots 23 against lateral displacement, the shoe end is held in centered position at all times. Since there are two cranks only one of which is actuated at a time to expand the friction element, both cam surfaces 26 remain in constant contact with the respective surfaces 27 in the anchored positions of the shoes (Fig. 2) and also in all of the actuated positions (Fig. 4). Thus, the desired centering of the shoes is achieved by making the grooves 28 relatively shallow so as to occupy only a short arc of the drum circumference. As a result, the provision of separate shoe guiding surfaces on the anchor is avoided and the shoe centering action is obtained in a simple and inexpensive way.

Selective actuation of the cranks 21 and 22 according to the direction of drum rotation is effected in the present instance by an electromagnetic momentum type operator comprising two magnetic rings 30 and 31 mounted within the shoes and axially spaced from the shoe ribs toward the drum flange 9. The ring 30, which constitutes an armature for the magnet ring 31, is substantially flat and is supported from the flange 9 for yieldable axial floating movement. The magnet is of U-shaped cross section having two concentric poles 33, an annular coil 35 between them, and segments 36 of friction material spanning the poles and flush with the end faces thereof. A bearing 37 on the anchor structure 10 supports the magnet for oscillation about the drum axis.

When the brake is released, the parts will be positioned as shown in Fig. 2, both shoe ends 15 being drawn against their anchor abutments 18 and the magnet 31 being correspondingly positioned. When the coil 35 is energized with the drum turning clockwise, the magnet grips the rotating armature 30 and turns therewith in the direction of drum rotation. The lever 21 is swung in the same direction moving the associated shoe ends away from the anchor, the other shoe end remaining fixed against its anchor. After the clearance has been taken up and the shoes have been expanded against the drum, slippage occurs between the magnet and armature, the magnet being held frictionally in actuated position. When the magnet is deenergized, the parts are returned to their released positions by the springs 19 and a spring (not shown) acting on the magnet. When the latter is energized with the drum turning in the opposite direction, the crank 22 is actuated by the pin 25 and the other shoe end is moved away from its anchor.

I claim as my invention:

A friction brake having, in combination, an annular friction element having spaced ends circumferentially separable to expand said element, a nonrotatable member including an anchor disposed between said ends for abutting engagement with the latter, the opposite sides of said anchor and the opposed end portions of said element being formed with parallel sided notches of equal widths lying in a plane perpendicular to the axis of said element in all positions of separation of the element ends and with the open ends of the notches of each coacting pair registering with each other when said element ends are in abutment with said anchor, two cranks pivoted on said anchor adjacent the outer end of said element and each projecting inwardly through one pair of coacting notches so as to separate one of said element ends from said anchor when the corresponding crank is swung in one direction is said plane, each of said cranks fitting closely within the walls of the notches and being of a width narrower than the combined depth of the mating pair of notches so as to remain in guiding engagement with the side walls of both notches in all positions of separation of the element end from said anchor, and an operator for expanding said element including a part disposed between the inner ends of said cranks and movable about said element axis in either direction away from a normal released position.

ARMOUR H. TITUS.

REFERENCES CITED

The following references are of record in the file of this patent:

UNITED STATES PATENTS

| Number | Name | Date |
|---|---|---|
| 1,970,951 | Chambers | Aug. 21, 1934 |
| 2,072,412 | Tarbox | Mar. 2, 1937 |
| 2,072,755 | Jones et al. | Mar. 2, 1937 |
| 2,106,167 | Colman | Jan. 25, 1938 |
| 2,132,049 | Schlumbrecht | Oct. 4, 1938 |
| 2,422,187 | Edgar | June 17, 1947 |
| 2,465,394 | Oetzel | Mar. 29, 1949 |